(12) United States Patent
Basconi

(10) Patent No.: US 9,016,656 B2
(45) Date of Patent: Apr. 28, 2015

(54) POST STABILIZER

(71) Applicant: Paul David Basconi, Durham, CT (US)

(72) Inventor: Paul David Basconi, Durham, CT (US)

( * ) Notice: Subject to any disclaimer, the term of this patent is extended or adjusted under 35 U.S.C. 154(b) by 0 days.

(21) Appl. No.: 13/815,293

(22) Filed: Feb. 20, 2013

(65) Prior Publication Data

US 2014/0231613 A1 Aug. 21, 2014

(51) Int. Cl.
| | |
|---|---|
| F16M 13/00 | (2006.01) |
| E04H 12/00 | (2006.01) |
| A01K 97/00 | (2006.01) |
| A45B 25/28 | (2006.01) |
| A45F 3/44 | (2006.01) |
| A47G 25/12 | (2006.01) |
| A47G 33/12 | (2006.01) |
| H01Q 1/12 | (2006.01) |
| E04H 17/22 | (2006.01) |
| E02D 5/74 | (2006.01) |
| E02D 5/80 | (2006.01) |

(52) U.S. Cl.
CPC *E04H 12/00* (2013.01); *E02D 5/80* (2013.01); *F16M 13/00* (2013.01); *A45F 3/44* (2013.01); *E02D 5/74* (2013.01); *E04H 17/22* (2013.01)

(58) Field of Classification Search
CPC .. A45B 2023/0012; A45B 23/00; A45F 3/44; B25B 5/10; E02D 5/80; E02D 5/76; E02D 5/805; E04B 1/34347; E04H 12/2215; E04H 15/60; E04H 15/62; E04H 12/2223; E04H 17/22; F16B 2/065; F16B 21/16; F16B 52/11

USPC .................................. 248/500, 507, 508, 156
See application file for complete search history.

(56) References Cited

U.S. PATENT DOCUMENTS

| | | | | |
|---|---|---|---|---|
| 3,342,444 | A * | 9/1967 | Nelson | 52/165 |
| 4,872,529 | A * | 10/1989 | Viets | 182/172 |
| 4,949,933 | A * | 8/1990 | Stone | 248/442.2 |
| 5,002,252 | A * | 3/1991 | Setala et al. | 248/533 |
| 5,984,587 | A * | 11/1999 | Odle | 405/244 |
| 6,370,817 | B1 * | 4/2002 | Brooks et al. | 47/43 |
| 6,705,621 | B1 * | 3/2004 | Drayer | 280/30 |
| 6,786,173 | B2 * | 9/2004 | Courtemanche | 116/63 P |
| 7,163,084 | B1 * | 1/2007 | Blehm | 182/172 |
| 2002/0088187 | A1 * | 7/2002 | Howard et al. | 52/162 |
| 2004/0107670 | A1 * | 6/2004 | Messier | 52/736.1 |

* cited by examiner

*Primary Examiner* — Jonathan Liu
*Assistant Examiner* — Taylor Morris
(74) *Attorney, Agent, or Firm* — Ted Paulding

(57) ABSTRACT

A stabilizer which has general purpose use but which is particularly well suited for use with temporary real estate signs has an elongated body adapted for pivotal connection with a post for vertical swinging movement. A plurality of flanges or wings are spaced apart longitudinally at an opposite and free end of the body and define flat laterally extending anchoring surfaces. The free end of the stabilizer body is inserted into the soil on forceful downward swinging movement of the body and the lateral anchoring surfaces firmly secure the post against angular movement toward and away from the stabilizer. The stabilizer can be releasably stored in an upright position adjacent the post.

6 Claims, 9 Drawing Sheets

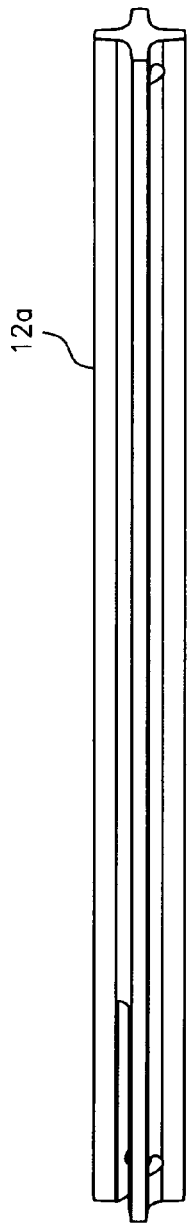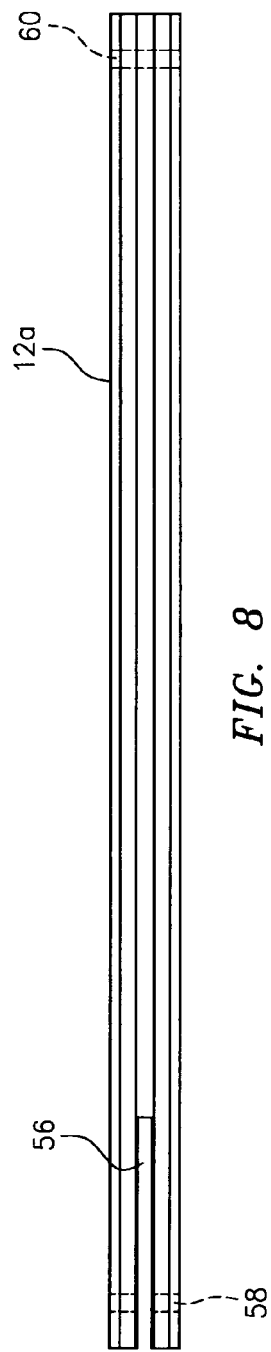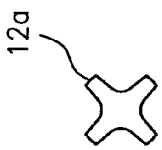
FIG. 7
FIG. 8
FIG. 9

POST STABILIZER

BACKGROUND OF THE INVENTION

The prior art discloses a wide variety of post stabilizers. However, none of the stabilizers found was wholly satisfactory for convenient and efficient use with temporary real estate signs and their supporting posts which are normally moved from one location to another after short term use and are required to present "curb appeal" as it is called in the trade. Obviously, signs that become angularly dislodged and lean from the vertical or perhaps even fall to the ground are undesirable.

It is the general object of the present invention to provide an improved post stabilizer which is adapted for both general purpose use as well as use with posts supporting temporary real estate signs, which is readily installed in operative relationship with an imbedded post with a minimum of effort and time expenditure, and which is yet highly effective in securing the post against unintended or accidental angular displacement.

SUMMARY OF THE INVENTION

An improved post stabilizer for general purpose use as well as use with temporary real estate signs comprises an elongated body adapted at one end for pivotal connection with a vertical post or the like embedded in the ground and for vertical swinging movement relative to the post. At least one and preferably a plurality of laterally extending members at the opposite and free end of the elongated body each defines at least one substantially flat laterally extending anchor surface. Preferably each member defines substantially flat laterally extending anchoring surfaces on opposite sides thereof with three (3) pairs of oppositely extending lateral members provided in longitudinally spaced-apart relationship. The laterally extended members are adapted for insertion downwardly into the soil therebeneath on forceful downward swinging movement of the free end of the elongated body of the stabilizer, the lateral anchoring surfaces thus being forced into pressure engagement with the adjacent soil and firmly securing the post against angular movement about its base in one and an opposite direction. A stabilizer body is also pivotally moveable to a storage position where it extends upwardly along and adjacent the post with a spring clip releasably securing its free end portion.

In preferred form an anvil-like substantially flat target surface is provided at the top of the elongated body adjacent its free end for ease in striking the body and thus forcefully inserting the same into the soil.

The pivotal connection between the elongated body and the post may be provided in various configurations but preferably comprises a bifurcated bracket mounted on the post and a lateral pivot pin cooperating with aligned lateral openings in the arms of the bracket and in an end portion of the elongated body.

DRAWINGS

Figure 1:
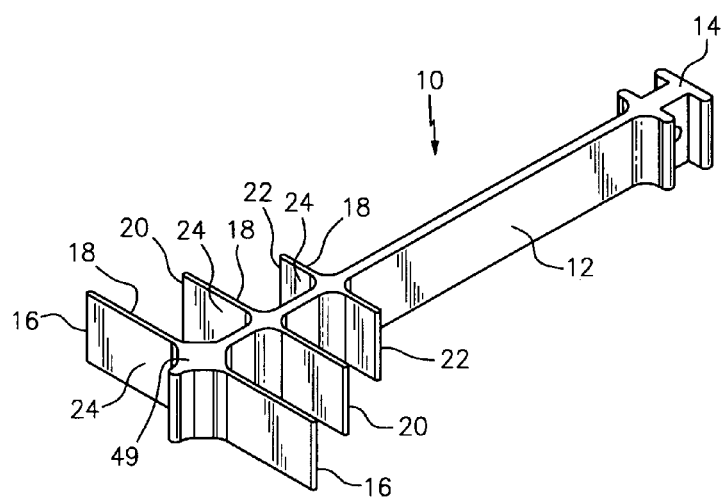
Figure 2:
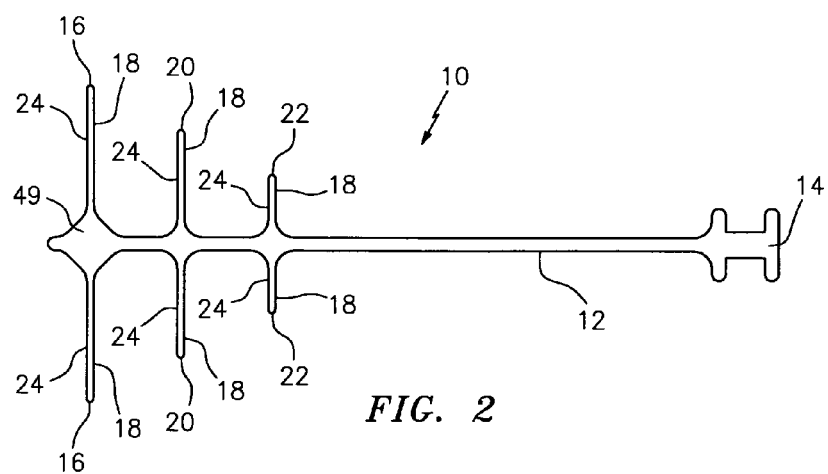
Figure 3:
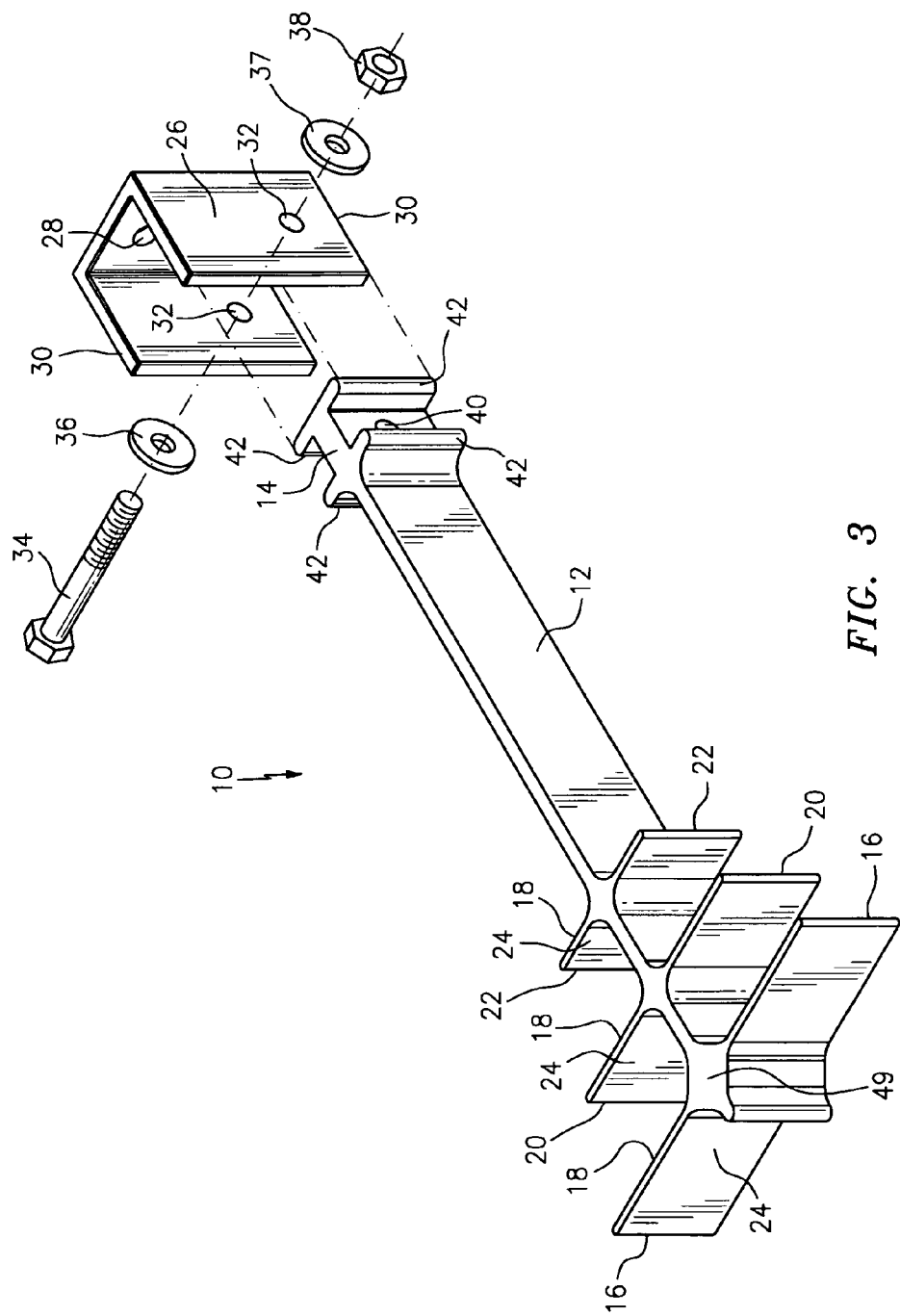
Figure 4:
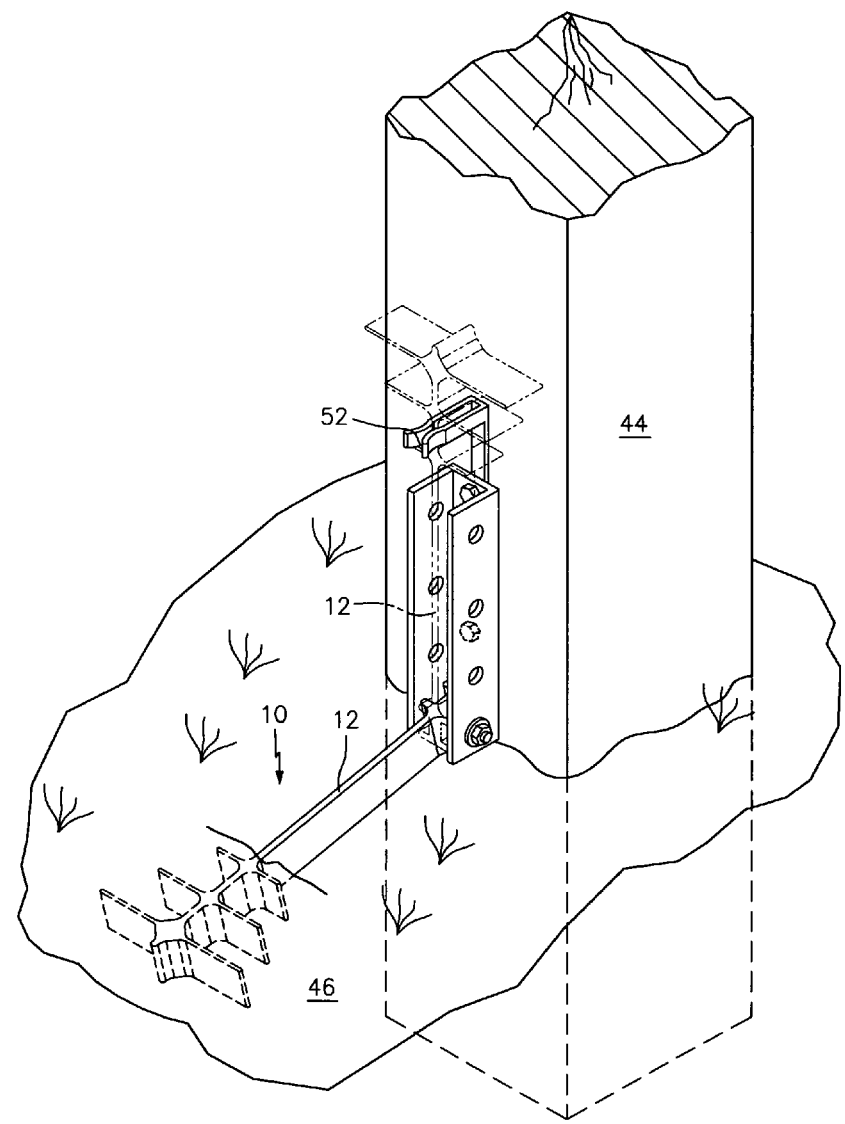
Figure 4A:
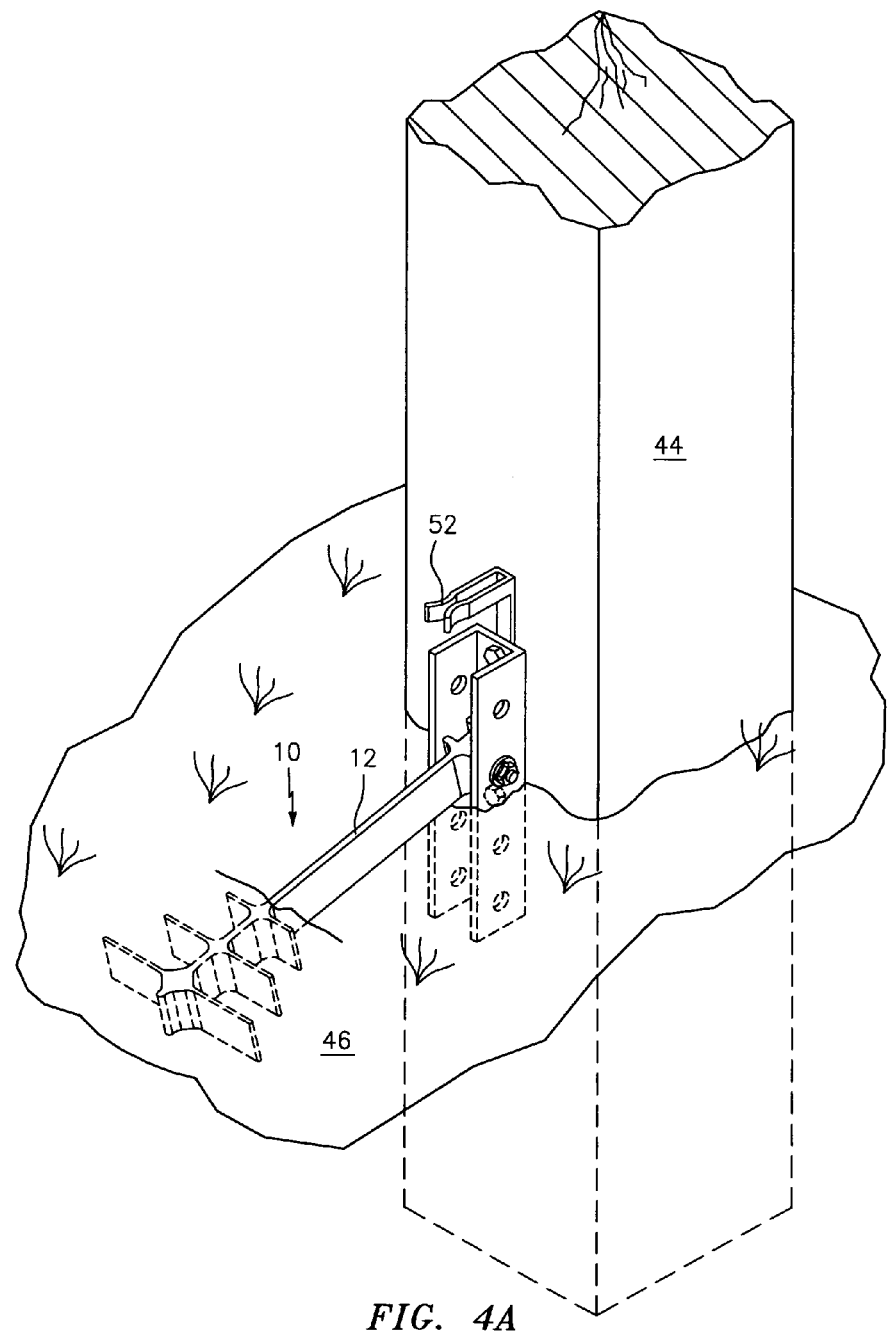
Figure 5:
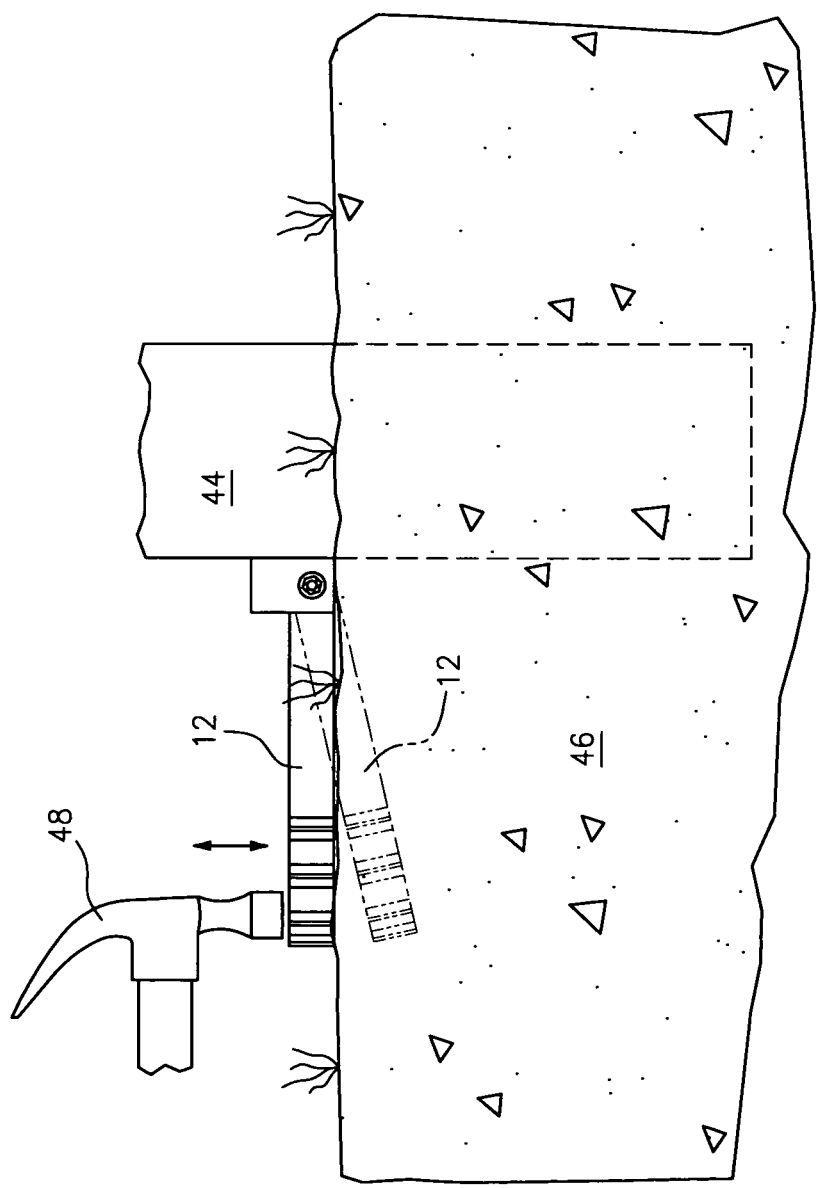
Figure 6:
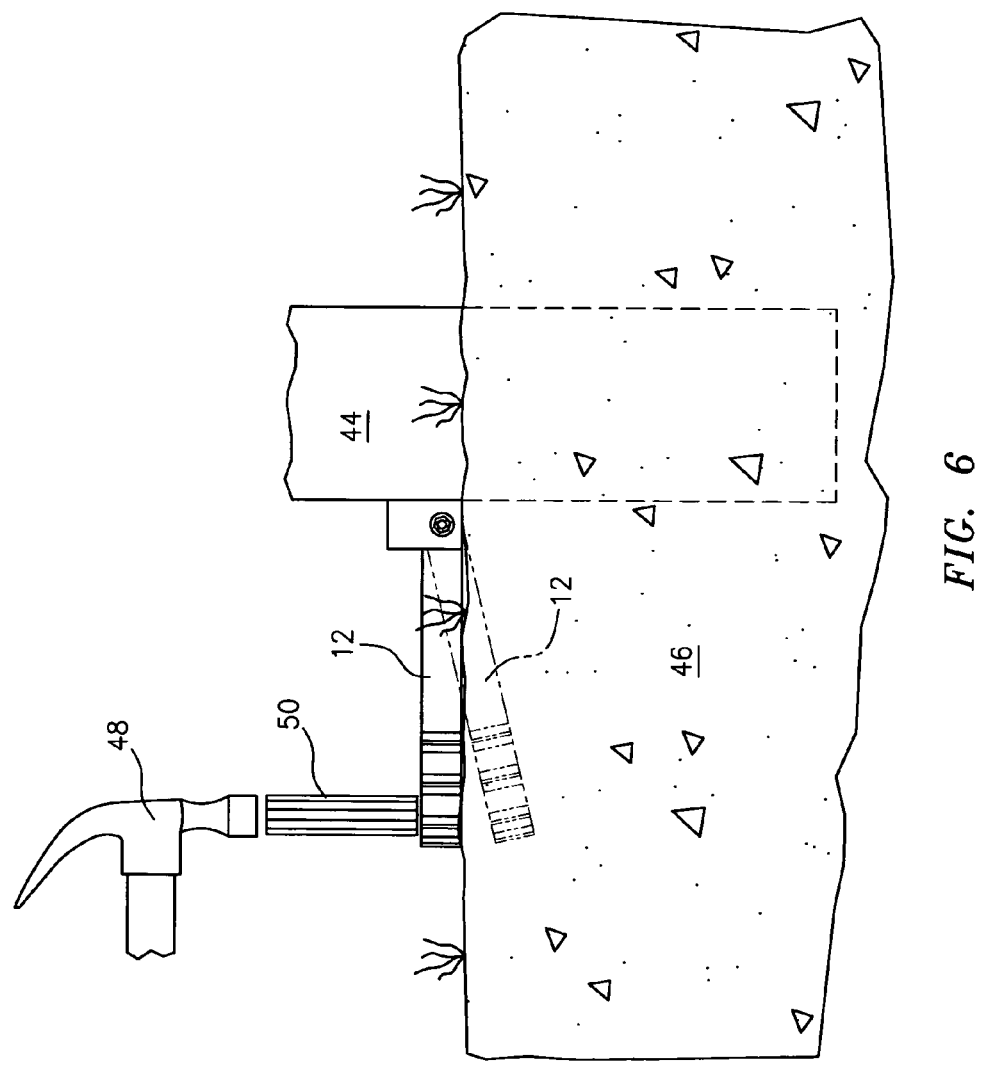
Figure 11:
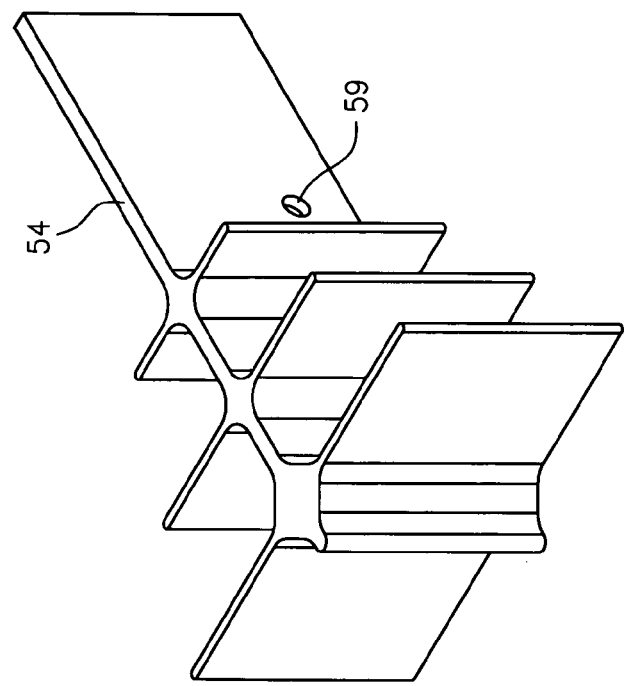
Figure 10:
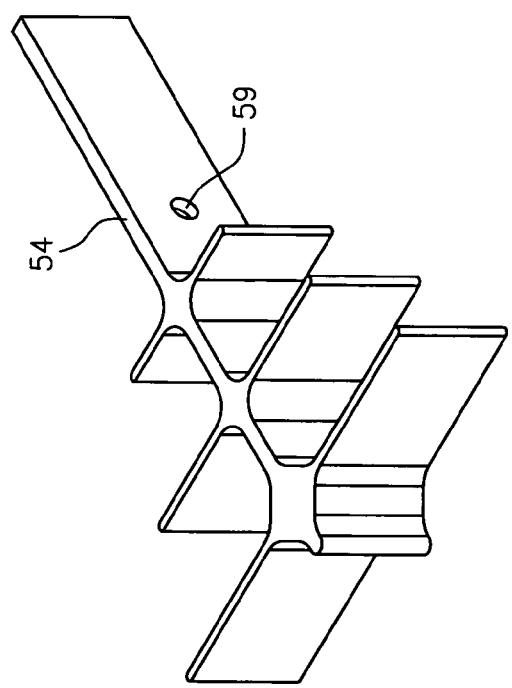
Figure 12:
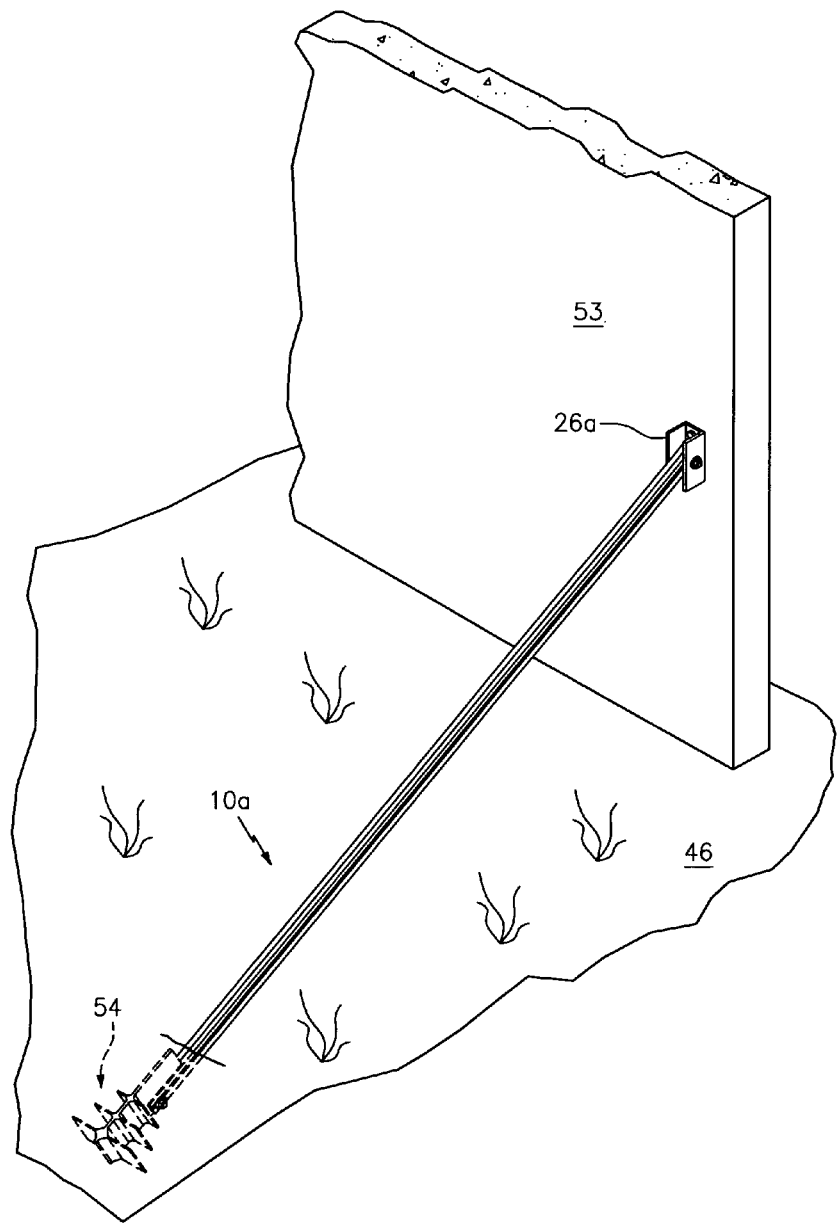

FIG. 1 is a perspective view of a stabilizer body absent associated pivotal connecting means at its end portion adjacent a post, FIG. 2 is a top view of the stabilizer body, FIG. 3 is a perspective view of the stabilizer body including a bifurcated bracket adapted to be mounted on a post and a cooperating pivot pin in the form of a conventional bolt passing through aligned openings in the bracket arms and the end portion of the stabilizer body, FIG. 4 is a perspective view illustrating the stabilizer pivotally mounted in operative position on a post with its free end portion inserted in adjacent soil, and also shows a spring clip holding the stabilizer in its storage position, FIG. 4A is a perspective view similar to FIG. 4 but shows the post in a deeper hole with the stabilizer connected to the bracket at a corresponding higher opening in the latter, FIG. 5 is a side view of a stabilizer of FIGS. 1 and 3 and a vertical cross-sectional view of the soil with the free end of the stabilizer body residing in operative position in the soil in broken line form, FIG. 6 is a view substantially identical with FIG. 5 except for the provision of an auxiliary driving rod that may be conveniently employed in forcefully inserting the free end of the stabilizer body downwardly into the soil, FIG. 7 is a perspective view of an elongated stabilizer body forming a part of a second embodiment of the invention, FIG. 8 is a top view of the stabilizer body of FIG. 7, FIG. 9 is a cross-sectional view of the stabilizer body of FIGS. 7 and 8, FIG. 10 is a perspective view of a separate free end portion of the stabilizer having three (3) spaced-apart laterally extending members each with substantially flat opposing anchoring surfaces, FIG. 11 is a perspective view similar to FIG. 10 but with vertically enlarged lateral members and corresponding anchoring surfaces, FIG. 12 is a perspective view of a stabilizer of the second embodiment in operative position securing a concrete upright member against angular displacement.

DESCRIPTION OF THE PREFERRED EMBODIMENTS OF THE INVENTION

Referring particularly to FIG. 1 through 3, a stabilizer indicated generally at 10, has an elongated body portion 12 adapted at one end portion 14 for pivotal connection with a vertical post or the like. At an opposite end portion, the stabilizer body 12 has at least one laterally extending portion 16 defining a substantially flat anchoring surface 18. Preferably and as shown, the stabilizer body 12 has three (3) longitudinally spaced-apart laterally extending pairs of members or flanges 16, 20, and 22 disposed on each side of the body 12. That is, laterally extending pairs of flanges project in opposite directions at 16, 16, 20, 20 and 22, 22. Each of the flanges 16, 20 and 22 defines a first substantially flat anchoring surface 18 on a side thereof facing the opposite end of the stabilizer body 12. Obviously, the surfaces 18, 18 secure an associated post against angular displacement away from the surfaces 18, 18. Additionally, each of the flanges, 16, 20 and 22 has a second substantially flat anchoring surface 24 on a side thereof opposite its first anchoring surface 18 which secures an associated post against angular displacement toward the free end portion of the stabilizer body. As will be apparent, the anchoring surfaces 18, 18 and 24, 24 collectively secure an associated post against unintended or accidental angular displacement in one and an opposite direction.

Referring now to FIG. 3 in particular, a mounting bracket 26 is provided with an opening 28, or preferably a plurality of such openings as shown, for attachment to a vertical post by means of a lag bolt, etc. The bracket 26 is bifurcated with arms 30, 30 spaced apart and provided with aligned openings 32, 32 for receiving a pivot pin 34, in the form of a conventional bolt having associated washers 36, 37 and a cooperating nut 38. The end of stabilizer body 14 has an opening 40 that also receives a pivot pin or bolt 34 when the end 14 is entered between the arms 30, 30 of the mounting bracket. Preferably small lateral flanges 42, 42 engage the inner walls of the arms 30, 30 to provide for secure attachment between the mounting bracket 26 and the body end portion 14 for smooth and controlled pivotal action of the body 12 relative thereto.

FIG. 4 shows the stabilizer 10 in operative position on a vertically extending post 44 embedded in soil 46. The free end of the body 12 may be forcefully inserted into the soil 46 as best illustrated in FIG. 5 by means of a conventional hammer 48 engaging an enlarged anvil-like target surface 49 (FIGS. 1-3) adjacent the end of the stabilizer body. In FIG. 6, a driving rod 50 is illustrated and may be utilized in forcefully driving the free end portion of the stabilizer body 12 downwardly into the soil. Anvil or target surface 49 is a further aid in driving the body downwardly. Preferably, the free end portion of the body is inserted into the soil at an angle in the general range of fifteen to thirty-five degrees depending on the terrain and soil conditions.

As illustrated, in FIGS. 4, 5, and 6, the stabilizer resides in pressure engagement with the subsurface soil and securely holds the post 44 against angular displacement in one and an opposite direction. With the stabilizer disposed in a storage position as illustrated in FIG. 4 and held by releasable spring clip 52, it is necessary merely to swing the stabilizer downwardly and insert the same into the soil adjacent an embedded post in order to provide the desired security against displacement of the post. Removal of the stabilizer can be readily achieved by withdrawing the free end of the same upwardly from its position in the soil.

Referring now to FIG. 12, a heavy duty version or embodiment of the stabilizer 10a is illustrated in operative position securing a wall-like vertical member 53 which may be of concrete or the like against angular displacement. Stabilizer 10a has a body 12a shown in FIGS. 7-9, which is substantially longer than the body 12 of the stabilizer 10, and a separate free end portion is provided at 54. The body 12a may be provided in any desired length and in a series of different lengths for selective use. Preferably the body has four right angularly arranged outwardly extending flanges in a cross-sectional configuration as shown in FIG. 9 for maximum strength. A slot 56 in the free end portion of the body receives a narrow inner portion of the separate free end portion 54 and a small lateral opening 58 may be provided for a connecting pin or bolt not shown. Opening 59 in the separate end portion 54 cooperates with the opening 58 and the pin or bolt.

The separate end portion 54 may be identical with the end portion described above for the preferred embodiment of the invention or, if additional strength is desired, lateral members or flanges of greater vertical dimension may be provided as illustrated in FIG. 11.

Bracket 26a may be identical with the bracket 26 and may have aligned openings that cooperate with the opening 60 in the body 12a to receive a pivot pin.

In its operative position as shown in FIG. 12, the stabilizer 10a provides exceptional strength and firm resistance against angular displacement for posts or other vertical members. Like the stabilizer 10, the stabilizer 10a is a model of simplicity, lightweight in construction, extremely easy and convenient to install and remove, and yet highly efficient and durable over long use.

The invention claimed is:

1. A general purpose stabilizer for use with a vertical member embedded in the ground at its lower end portion; said stabilizer comprising: an elongated arm which extends to undisturbed naturally compacted soil beyond the soil excavated during embedding of the vertical member; the elongated arm having a pivotal end and a free end, the pivotal end being pivotally connected to a bracket adapted for mounting to the vertical member to allow for vertical swinging movement, the free end having a plurality of spaced apart laterally extending members formed integrally adjacent the free end of the elongated arm which decrease in length in progression from the free end of the elongated arm, each of said laterally extending members having inner and outer, oppositely facing, substantially flat anchoring surfaces extending at right angles to the longitudinal axis of the elongated arm; the laterally extending members being adapted for insertion into the soil therebeneath on forceful downward swinging movement of the elongated arm of the stabilizer, and the anchoring surfaces being forced arcuately downwardly into pressure engagement with the adjacent soil by the downward movement of the elongated arm with the inner anchoring surfaces forcing adjacent soil inwardly toward the vertical member and the outer anchoring surface forcing adjacent soil away from the vertical member, both natural and manually created soil compaction thus being employed to provide dual direction stabilization firmly securing the vertical member against angular movement about its base; and the elongated arm being pivotally movable for storage where it resides in an upwardly extending position along and adjacent the vertical member, the elongated arm being held in the upwardly extending position on the vertical member by a releasable means, the releasable means comprising a spring clip directly attached to the bracket.

2. A general purpose stabilizer as set forth in claim 1, wherein said plurality of spaced apart laterally extending members comprises three (3) longitudinally spaced apart laterally extending members.

3. A general purpose stabilizer as set forth in claim 1, wherein a substantially flat target surface is provided at the top of the elongated arm adjacent the free end for ease in striking the arm and thus forcefully inserting the free end into the soil.

4. A general purpose stabilizer as set forth in claim 1, wherein the pivotal connection between the elongated arm and the bracket is provided by a pivot pin cooperating with aligned lateral openings in the bracket and an end portion of the elongated arm.

5. A general purpose stabilizer as set forth in claim 1, wherein the bracket further comprises a bifurcated bracket with a vertical series of openings for attachment to the upright member, the arms of the bracket and the pivotal end of the body being provided with aligned lateral openings for the receipt of a pivot pin.

6. A general purpose stabilizer as set forth in claim 1, wherein the elongated arm having flanges on its end portion that provide a smooth and controlled pivotal fit between the arms of the pivot bracket.

* * * * *